(12) United States Patent
Seenivasan

(10) Patent No.: US 7,562,777 B1
(45) Date of Patent: Jul. 21, 2009

(54) FLOTATION CELL INJECTOR ASSEMBLY FOR USE WITH OPEN OR CLOSED FLOTATION DEINKING MODULES FOR RECYCLED PAPER

(76) Inventor: Narayanasamy Seenivasan, 3828 Cochran Dr., Carrollton, TX (US) 75010

( * ) Notice: Subject to any disclaimer, the term of this patent is extended or adjusted under 35 U.S.C. 154(b) by 386 days.

(21) Appl. No.: 11/451,197

(22) Filed: Jun. 12, 2006

(51) Int. Cl.
B03D 1/24 (2006.01)
B01F 3/04 (2006.01)

(52) U.S. Cl. .................... 209/170; 261/76; 261/DIG. 75

(58) Field of Classification Search ................. 209/170; 261/76, DIG. 75
See application file for complete search history.

(56) References Cited

U.S. PATENT DOCUMENTS

| | | |
|---|---|---|
| 1,279,040 A | 9/1918 | Thomas |
| 2,793,185 A | 5/1957 | Albrektsson et al. |
| 3,043,433 A | 7/1962 | Singer |
| 3,098,784 A | 7/1963 | Gorman, Jr. |
| 3,354,028 A | 11/1967 | Illingworth et al. |
| 4,110,210 A | 8/1978 | Degner et al. |
| 4,157,952 A | 6/1979 | Krofta |
| 4,328,095 A | 5/1982 | Ortner et al. |
| 4,331,534 A | 5/1982 | Barnscheidt |
| 4,477,341 A | 10/1984 | Schweiss et al. |
| 4,560,474 A | 12/1985 | Holik |
| 4,639,313 A | 1/1987 | Zipperian |
| 4,701,194 A * | 10/1987 | Weyers et al. ................. 96/242 |
| 4,726,897 A | 2/1988 | Schweiss et al. |
| 4,737,272 A | 4/1988 | Szatkowski et al. |
| 4,842,777 A | 6/1989 | Lamort |
| 5,242,585 A | 9/1993 | Krofta |
| 5,273,624 A | 12/1993 | Chamberlain et al. |
| 5,310,459 A | 5/1994 | Krofta |
| 5,437,784 A | 8/1995 | Meinecke et al. |
| 5,465,848 A | 11/1995 | Veh et al. |
| 5,529,190 A | 6/1996 | Carlton et al. |
| 5,624,609 A | 4/1997 | Serres et al. |
| 5,762,781 A | 6/1998 | Bodnaras |
| 6,082,549 A | 7/2000 | Gommel et al. |
| 6,197,153 B1 | 3/2001 | Serres |
| 6,224,042 B1 * | 5/2001 | Popov ........................ 261/76 |
| 6,585,854 B2 | 7/2003 | Scherzinger et al. |
| 6,881,297 B2 | 4/2005 | Scherzinger et al. |
| 6,959,815 B2 | 11/2005 | Xu et al. |

FOREIGN PATENT DOCUMENTS

| | | |
|---|---|---|
| GB | 2.017.780 | 10/1979 |
| GB | 2.130.920 | 6/1984 |
| GB | 2.144.729 | 3/1985 |
| WO | WO8803838 | 6/1988 |

* cited by examiner

Primary Examiner—Thomas M Lithgow
(74) Attorney, Agent, or Firm—Michael I Kroll

(57) ABSTRACT

An injector assembly that forms means for gasifying a slurry by expanding the infeed bore within the injector assembly having a source of ambient air in communication therewith whereby the negative pressure created draws air into the slurry prior to injection into a flotation cell whereupon the contaminants within the slurry combine with the air bubbles forming a foam at the surface of the cell that is passively directed into a reject nozzle leaving a decontaminated slurry, known as the accept, which is channeled therefrom for further processing.

5 Claims, 11 Drawing Sheets

US 7,562,777 B1

FLOTATION CELL INJECTOR ASSEMBLY FOR USE WITH OPEN OR CLOSED FLOTATION DEINKING MODULES FOR RECYCLED PAPER

BACKGROUND OF THE INVENTION

1. Field of the Invention

The present invention relates generally to injectors and more specifically, to an injector assembly for open or closed flotation cell de-inking modules for recycled paper.

The injector assembly of the present invention forms means for gasifying a slurry by expanding the infeed bore within the injector assembly having a source of ambient air in communication therewith whereby the negative pressure created draws air into the slurry prior to injection into a cell whereupon the contaminants within the slurry combine with the air bubbles rising to a foam at the surface of the cell that is passively directed into a reject nozzle leaving a decontaminated slurry, the accept, that is harvested for further processing.

The injector assembly of the present invention comprises a housing having a flange on each opposing end whereby the injector assembly can be fixedly positioned inline with the slurry feed line. The housing encompasses a plurality of injector nozzles and ports depending from the housing for attachment of an air control module.

The injector assembly serves to gasify the slurry by diametrically modifying the feed line(s) within the housing at a desired point by incorporating one or more nozzles wherein the diametrically altered feed line(s) creates negative pressure as the smaller nozzle(s) engages the larger nozzle(s) fixated at a point engaging one or more housing vent(s) providing means for introducing a substance into the slurry using the negative pressure to passively draw the substance into the slurry to the point of varying the slurry mixture as desired including infusing air from the air control module.

The injectors are comprised of lengths of nozzle with the ingress portion of each injector diametrically smaller than the egress portion of the injector so that the exterior wall of the ingress portion is spaced away from the interior wall of the egress portion with the clearance therebetween serving as the air intake passage.

The number of injectors within the injector assembly can vary as needed. The diameters of the ingress and egress members are a function of the volume of air desired to be entrained within the slurry.

The injector assembly includes a plurality of injector support plates with the injector support plates diametrically sized substantially similar to the housing interior diameter and the injector support apertures also sized diametrically to their respective injector members.

The spacing between the opposing ingress support plate and egress support plate form an air chamber that serves as the slurry air supply and draws additional air from a remote air control module. The ingress section of the injector is positioned a predetermined distance within the egress section thereby creating negative pressure that will entrain air from the air chamber into the pulp slurry 2. Description of the Prior Art There are other injectors. Typical of these is U.S. Pat. No. 1,279,040 issued to Thomas on Sep. 17, 1918.

Another patent was issued to Degner on Aug. 29, 1978 U.S. Pat. No. 4,110,210. Yet another U.S. Pat. No. 4,477,341 was issued to Schweiss on Oct. 16, 1984 and still yet another was issued on Dec. 24, 1985 to Holik as U.S. Pat. No. 4,560,474.

Another patent was issued to Schweiss on Feb. 23, 1988 as U.S. Pat. No. 4,726,897. Yet another U.S. Pat. No. 4,842,777 was issued to Lamort on Jun. 27, 1989. Another was issued to Meinecke on Aug. 1, 1995 as U.S. Pat. No. 5,437,784 and still yet another was issued on Nov. 14, 1995 to Veh as U.S. Pat. No. 5,465,848.

Another patent was issued to Serres on Apr. 29, 1997 as U.S. Pat. No. 5,624,609. Yet another U.S. Pat. No. 6,881,297 was issued to Scherzinger on Apr. 19, 2005.

Internationally, a patent was issued in Great Britain as Patent No. GB2130920 to Voith on Jun. 13, 1984. Additionally, a World Publication was issued to Jungmann on Jun. 6, 2002 as World Publication No. WO8803838.

U.S. Pat. No. 1,279,040

Inventor: Thomas

Issued: Sep. 17, 1918

The invention is based upon the discovery that the preliminary treatment of finely divided ore with oil or with oil and an acid may be, in some instances, entirely dispensed with, and, in other instances, materially diminished, thereby effecting a savings of all or a portion of the oil and heretofore employed, by utilizing in the flotation receptacle, in lieu of air, the products of combustion, incident to the operation of an internal combustion engine of the oil or gas type while still in a highly heated condition.

U.S. Pat. No. 4,110,210

Inventor: Degner

Issued: Aug. 29, 1978

A process wherein hydraulic effects are used to disperse gas bubbles throughout a contained liquid body with a free surface. The process comprises ejecting a two-phase fluid into the liquid body with the density and the kinetic energy of the ejected fluid per unit of the contained volume being such as to define a point within the area encompassed by Regions I and II in the graph of FIG. 2.

U.S. Pat. No. 4,477,341

Inventor: Schweiss

Issued: Oct. 16, 1984

The injector apparatus is of the kind having a constriction which lies, in the flow direction, immediately before a following adjoining mixing section, in which fibrous stock suspension is mixed with air for the purpose of subjecting the suspension to in a tank. The mixing pipe in which the mixing section is disposed has a radial diffusor at its outlet end, and, for a greater flow rate of air, additional air intake bores are disposed therein a short distance in the flow direction after the constriction. A favorable arrangement is achieved if the injector apparatus with the mixing pipe is arranged perpendicularly in a tank, which may have the form of a reclining cylinder. In this case, the froth, like the cleaned suspension, is drawn off on one long side, i.e., a side which extends parallel to the cylinder axis; the extraction opening for the cleaned suspension being provided preferably immediately below the level of the suspension and/or the froth extraction arrangement.

U.S. Pat. No. 4,560,474

Inventor: Holik

Issued: Dec. 24, 1985

The apparatus has a vessel or container into which vortex or turbulence channels lead. These vortex channels supply the fiber suspension or stock to the vessel and are provided with at least one stepped enlargement. An air nozzle supplying air opens into the vortex channel. The vessel is substantially cylindrical about a vertical axis and is provided in its upper region with a central nozzle or pipe for extracting the foam. In the lower region of the vessel a nozzle for extracting the recovered good stock is disposed tangentially.

U.S. Pat. No. 4,726,897

Inventor: Schweiss

Issued: Feb. 23, 1988

A cell featuring a mixing pipe which enters the suspension essentially vertically, follows the point of air intake, and generally receives the entire suspension quantity per cell, the injector of the cell is offset sideways relative to the vertical center axis of the round container cross-section and away from the side on which the foam removal opening and the liquid drain opening are located. The mixing pipe (1) enters the suspension only for a distance such that its discharge opening, mouth (2), is located at least at one-half the height of the level of the overflow edge (7) of the foam removal channel (8), figured from the container bottom. The liquid drain opening (9) is preferably provided in the immediate vicinity of the container bottom, with a cover plate (11) extending across the length of the cell and forming a drain channel (12) into which proceeds the clean liquid through an upper (14) and a lower (13) slot.

U.S. Pat. No. 4,842,777

Inventor: Lamort

Issued: Jun. 27, 1989

The invention relates to a multiple liquid injector composed of several identical elementary injection tubes 2, disposed in a rim around a central tube. Each tube 2 has an inlet nozzle 3, itself comprising a converging truncated cone 6 and a cylinder 7, followed by an aeration zone 4 comprising an aeration chamber 8 fed tangentially by a nozzle 9 perpendicular to the tubes 2, a jet centering funnel 10, followed by mixing cylinder 11, and lastly a diverging outlet nozzle 12.

U.S. Pat. No. 5,437,784

Inventor: Meinecke

Issued: Aug. 1, 1995

A device includes an injector having a flow channel with a variable cross sectional area with respect to the direction of fluid flow through the injector. The injector introduces a mixture of gas and liquid into the device. The injector flow channel has repeated narrowings and widenings in the direction of fluid flow through the injector.

U.S. Pat. No. 5,465,848

Inventor: Veh

Issued: Nov. 14, 1995

A cell with at least one injector for introducing a fluid and aspirating air therethrough has a multi-hole aperture plate. Premixing tube sections are disposed in the injector downstream from the aperture plate at a distance from the plate of at least 0.1 times the diameter of a hole in the aperture plate. The tube sections are oriented perpendicular to the aperture plate and open into a mixing tube.

U.S. Pat. No. 5,624,609

Inventor: Serres

Issued: Apr. 29, 1997

An air injector for the foaming of paper pulp, comprised of a hollow cylindrical tube inside which is arranged a cylindrical bore (3) leading into a convergent portion and a divergent portion (2a, 2b, 2c), said cylindrical bore being occluded by a stopper fitted with holes (8) providing a cylindrical air inlet chamber (3a).

U.S. Pat. No. 6,881,297

Inventor: Scherzinger

Issued: Apr. 19, 2005

A device and process for aerating dispersions, particularly for of pulp suspensions, in a de-inking process where the pulp suspension containing dirt particles is sprayed into a tank together with air. The air is injected at a minimum of two successive points and mixed with the suspension.

Great Britian. Patent Number GB2130920

Inventor: Voith

Issued: Jun. 13, 1984

An injector is provided in each cell via which the suspension is supplied in the vicinity of the base of each cell. An upwards flow of the suspension occurs, during which of the dirt particles takes place. In the vicinity of the base of each cell some of the suspension is drawn off and is supplied again in the circuit to the injector of the cell concerned. In this way the minimum average period of dwell for all the particles of each cell is correspondingly longer and the overall effect is correspondingly improved.

World Publication Number 88/03838

Inventor: Jungmann

Issued: Jun. 6, 2002

Ring injectors for aerating fluids, useful for example in systems, have a housing with a mixing section, in which air is added to the through-flowing fluid through an annular slot. A core is arranged in the center of the mixing section. An air-solid mix is formed in the mixing section by deposition of air bubbles on solid particles. An annular injector with a slot width (Q2) that leads into the airing chamber with a minimum opacifying speed of 2.0 n/s at the inlet of the aerating chamber, has an annex mixing and dispersing section (6) with a cross-section that remains the same until the end (12), as well as a middle piece (10) centrally arranged therein also having a constant cross-section, the length of the mixing and dispersing section (6) being 20 times the width of the annular slot (Q3). The distributing cone (2) and the middle piece (10) can be screwed together or inserted into each other. The air slot can be regulated by spacing rings (13). Screw-shaped strips (8) within the mixing and dispersing section (6) can generate therein a whirl. The aerating device has been tested for the of mineral coal sludges.

While these injector assemblies may be suitable for the purposes for which they were designed, they would not be as suitable for the purposes of the present invention, as hereinafter described.

SUMMARY OF THE PRESENT INVENTION

A primary object of the present invention is to provide a flotation cell injector unit.

Another object of the present invention is to provide a flotation cell injector unit for an open or closed flotation de-inking module for recycled paper.

Yet another object of the present invention is to provide a flotation cell injector unit that forms means for gasifying a slurry by expanding the infeed bore within the injector assembly.

Still yet another object of the present invention is to provide a flotation cell injector unit that utilizes a source of ambient air in communication therewith whereby the negative pressure created draws air into the slurry prior to injection into a cell.

Another object of the present invention is to provide a flotation cell injector unit whereupon the contaminants within the slurry combine with the air bubbles forming a foam at the surface of the cell that is passively directed into a reject nozzle.

Yet another object of the present invention is to provide a flotation cell injector unit that leaves a decontaminated slurry, known as the accept, that is channeled for further processing.

Still yet another object of the present invention is to provide a injector assembly that comprises a housing having a flange on each opposing end whereby the injector assembly can be fixedly positioned inline with the slurry feed line.

Another object of the present invention is to provide a flotation cell injector unit whereupon the housing encompasses a plurality of injector nozzles and ports depending from the housing for attachment of an air control module.

Yet another object of the present invention is to provide a flotation cell injector unit whereupon injectors are comprised of lengths of nozzle with the ingress portion of each injector diametrically smaller than the egress portion of the injector so that the exterior wall of the ingress portion is spaced away from the interior wall of the egress portion with the clearance therebetween serving as the air intake passage.

Additional objects of the present invention will appear as the description proceeds.

The present invention overcomes the shortcomings of the prior art by providing an injector assembly that forms means for gasifying a slurry by expanding the infeed bore within the injector assembly having a source of ambient air in communication therewith whereby the negative pressure created draws air into the slurry prior to injection into a cell whereupon the contaminants within the slurry combine with the air bubbles forming a foam at the surface of the cell that is passively directed into a reject nozzle leaving a decontaminated slurry, known as the accept, which is channeled therefrom for further processing.

The foregoing and other objects and advantages will appear from the description to follow. In the description: reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
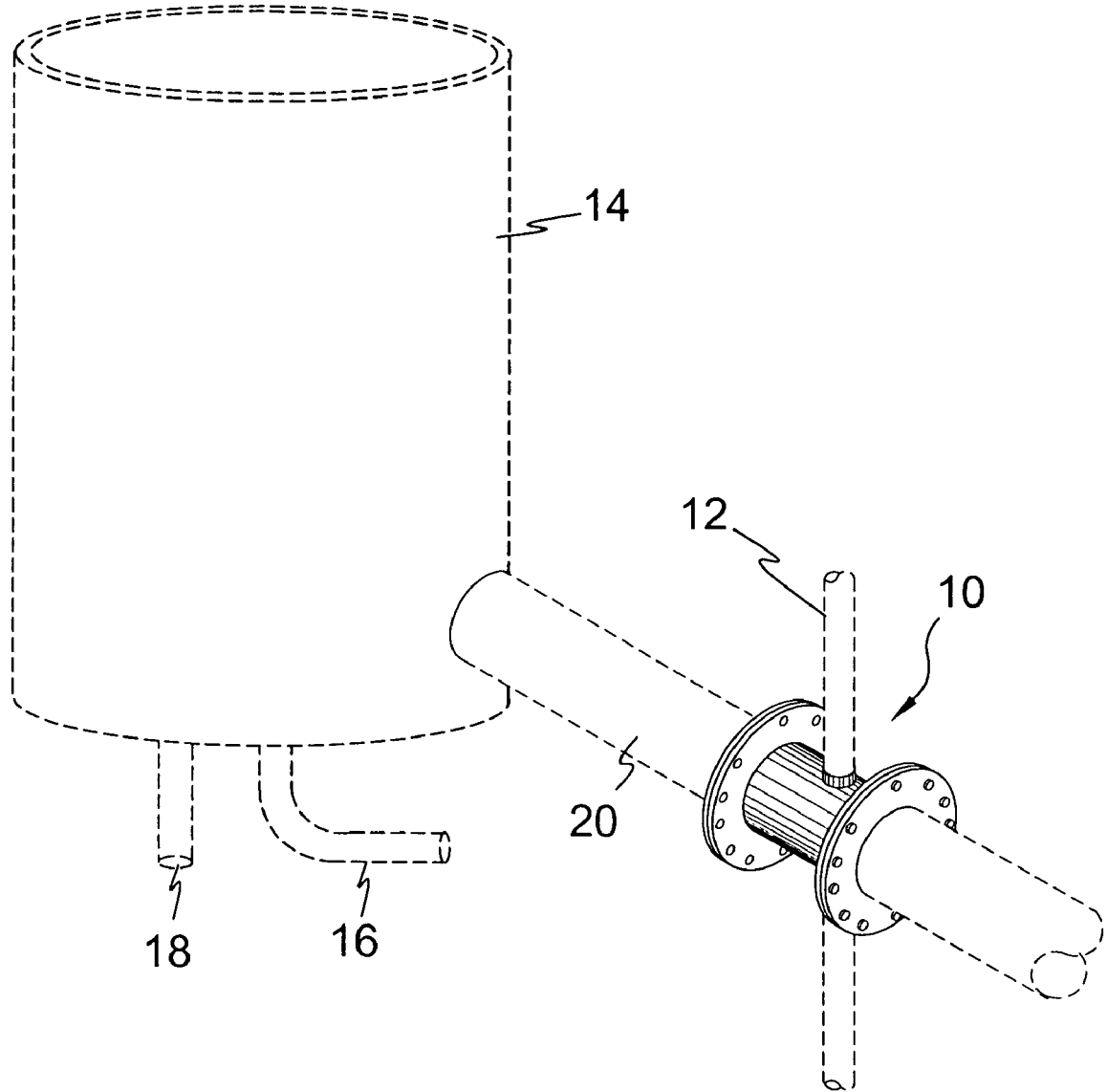
FIG. 1 is an illustrative view of the injector assembly of the present invention in use.

Turning now descriptively to the drawings, in which similar reference characters denote similar elements throughout the several views, the figures illustrate the Flotation Cell Injector Assembly of the present invention. With regard to the reference numerals used, the following numbering is used throughout the various drawing figures.

| | |
|---|---|
| 10 | Flotation Cell Injector Assembly of the present invention |
| 12 | air supply line |
| 14 | flotation cell |
| 16 | reject conduit |
| 18 | accept line |
| 20 | slurry feed line |
| 22 | housing |
| 24 | flange of 22 |

-continued

| 26 | air intake port |
| 28 | injector |
| 30 | ingress nozzle of 28 |
| 32 | egress nozzle of 28 |
| 34 | air intake passage |
| 36 | injector support plates |
| 38 | apertures of 36 |
| 40 | ingress support plate |
| 42 | egress support plate |
| 44 | air chamber |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the injector assembly 10 of the present invention in use. The injector assembly 10 forms means for gasifying a slurry by expanding the infeed bore within the injector assembly 10 having an air supply line 12 as a source of ambient air in communication therewith whereby the negative pressure created draws air into the slurry prior to injection through a slurry feed line 20 into a flotation cell 14 whereupon the contaminants within the slurry combine with the air bubbles forming a foam at the surface inside of the cell 14 that is passively directed into a reject nozzle 16 leaving a decontaminated slurry, known as the accept, which is channeled therefrom through an accept line 18 for further processing.

Figure 2:
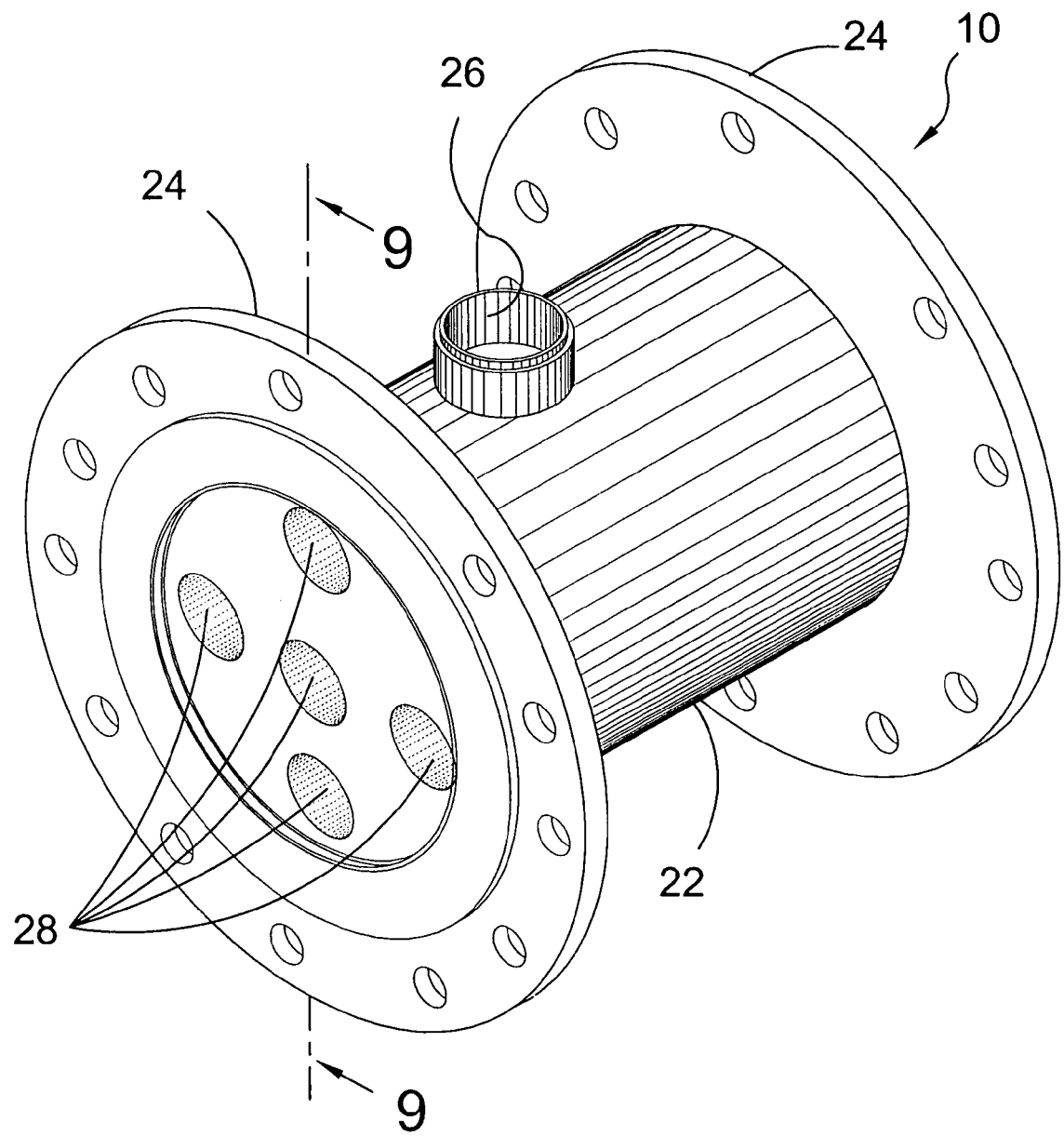
FIG. 2 is a perspective view of the injector assembly of the present invention.

FIG. 2 is a perspective view of the injector assembly 10 of the present invention. Shown is the injector assembly 10 comprising a housing 22 having a flange 24 on each opposing end whereby the injector assembly can be fixedly positioned inline with the slurry feed line. The housing 22 encompasses a plurality of injector nozzles 28 and ports 26 depending from the housing for attachment of an air control module. The injector assembly 10 serves to gasify a slurry by diametrically expanding the output line relative to the input line so that negative pressure is created at the ingress end of the output line, which passively infuses the slurry with air from the air control module. Air is introduced into the injector assembly 10 through the air intake port 26 in communication with the air supply line.

Figure 3:
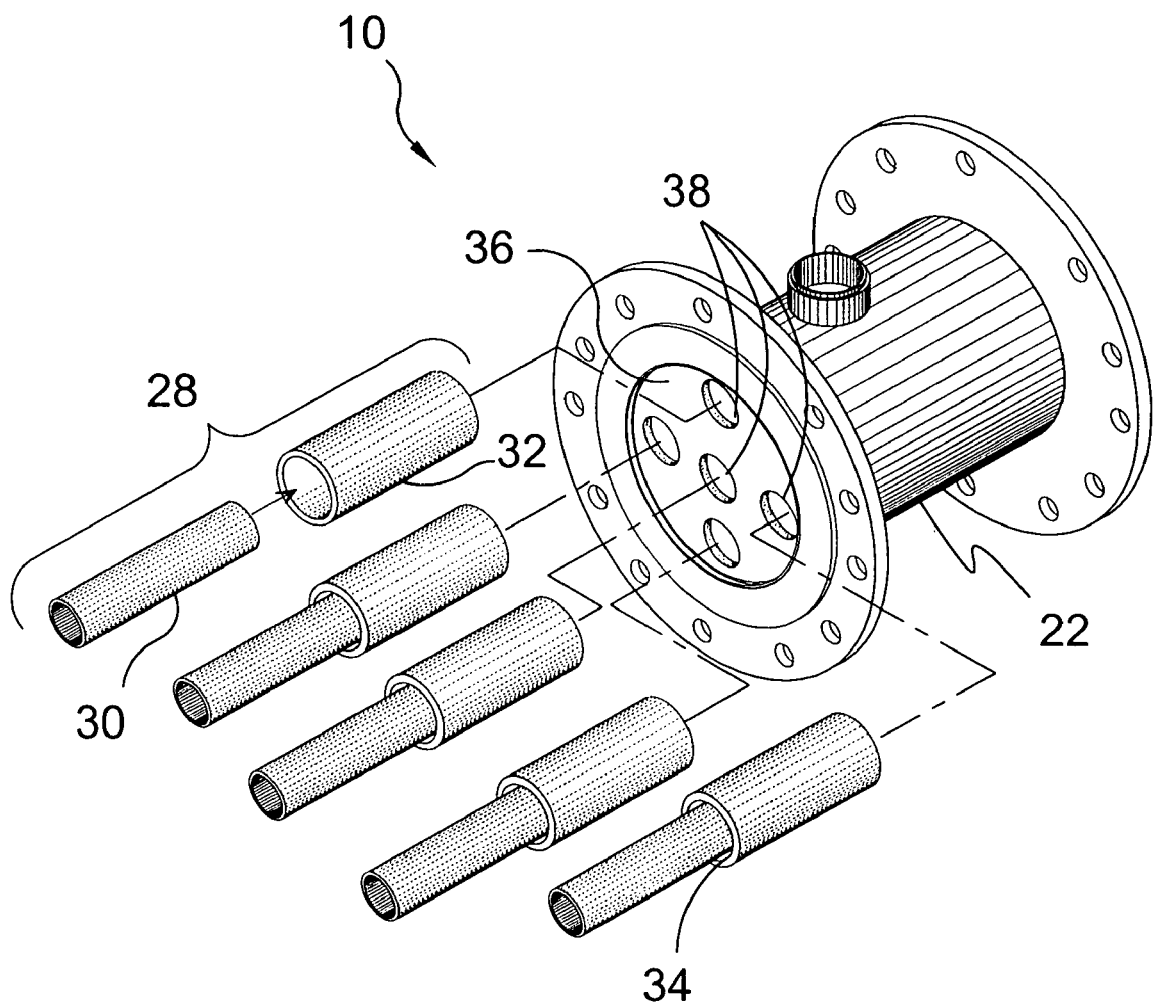
FIG. 3 is an exploded view of the injector and injector assembly.

FIG. 3 is an exploded view of the injector assembly 10. Shown is the injector assembly 10 with the injectors 28 removed. The injectors 28 are comprised of lengths of nozzle with the ingress nozzle 30 of each injector 28 diametrically smaller than the egress nozzle 32 of the injector 28 so that the exterior wall of the ingress nozzle 30 is spaced away from the interior wall of the egress nozzle 32 with the clearance therebetween serving as the air intake passage 34. Positioned within the housing 22 of the injector assembly 10 is a plurality of injector support plates 36 having apertures 38 sized to receive their respective injector members. It should be noted that the number of injectors 28 within the injector assembly 10 can vary as needed and the diameters of the ingress 30 and egress 32 nozzles is a function of the volume of air desired to be entrained within the slurry.

Figure 4:
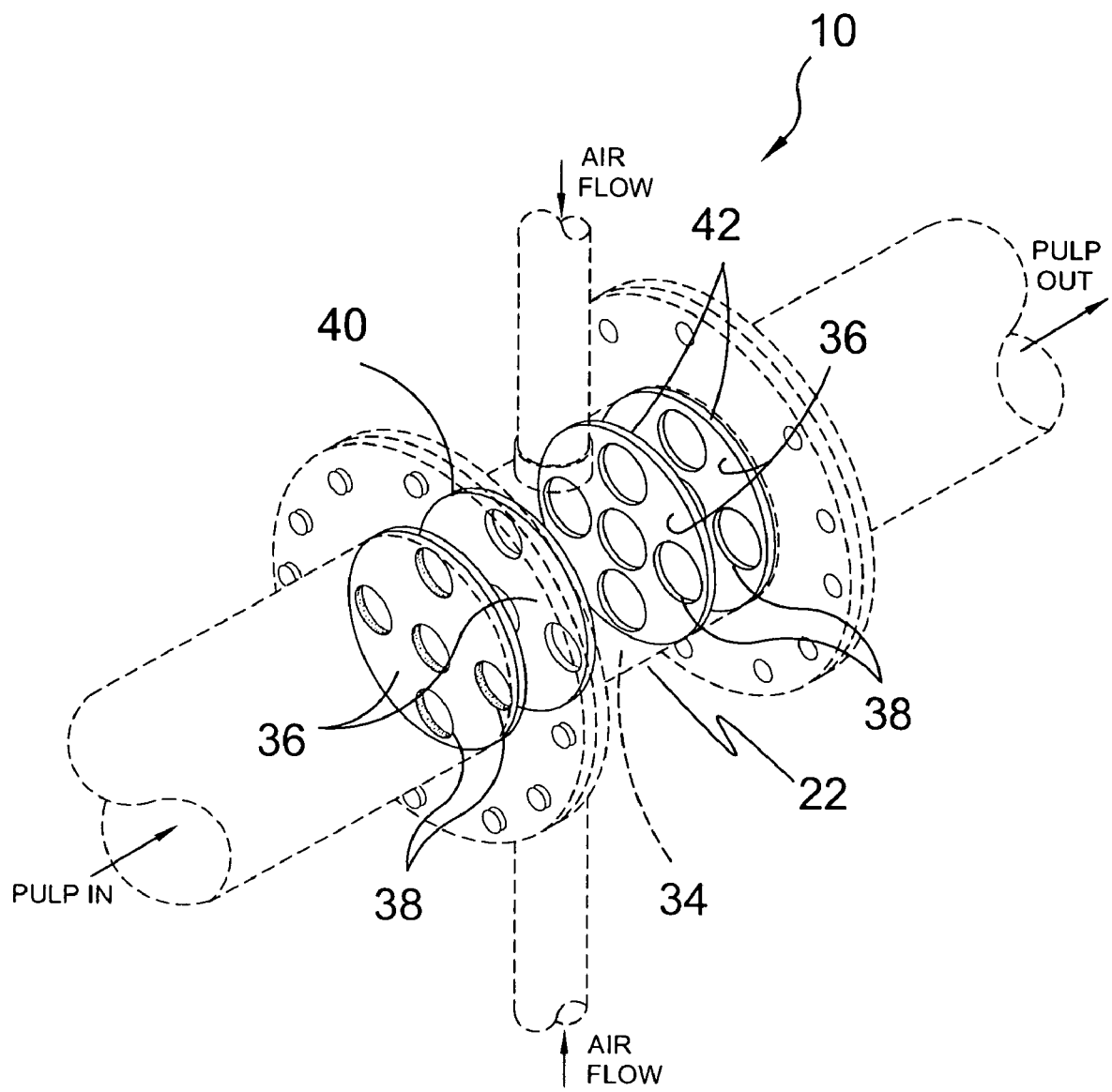
FIG. 4 is an illustrative view of the injector support plates within the injector assembly housing.

FIG. 4 is an illustrative view of the injector support plates 36 within the housing 22 of the injector assembly 10. Shown is the injector assembly 10 having a plurality of injector support plates 36 diametrically sized substantially similar to the housing interior diameter and the injector support apertures 38 also sized diametrically to their respective injector nozzles. The spacing between the opposing ingress support plate 40 and egress support plate 42 form an air chamber 34 that serves as the slurry air supply and draws additional air from a remote air control module.

Figure 5:
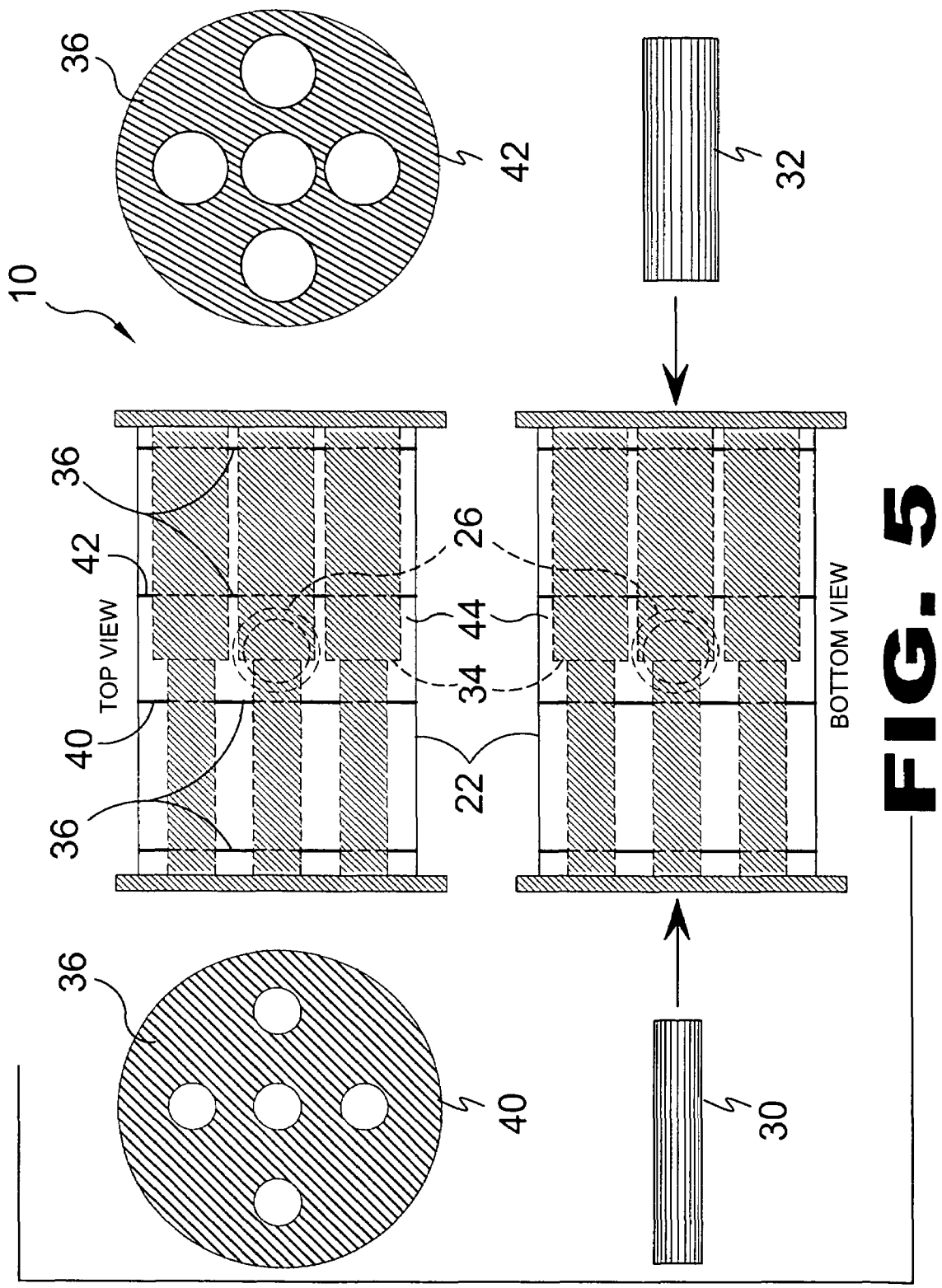
FIG. 5 is pictorial views of the components of the injector assembly.

FIG. 5 is pictorial views of the components of the injector assembly 10. The housing 22 encompasses a plurality of injector nozzles 30,32 and air intake ports 26 depending from the housing 22 for connection to an air control module. The injector assembly 10 serves to gasifying a slurry by diametrically expanding the egress nozzle 32 relative to the ingress nozzle 30 so that negative pressure is created at the ingress end of the egress nozzle 32, which passively infuses the slurry with air from the air chamber 44 formed between the opposing ingress injector support plate 40 and egress support plate 42 with additional air supplied by a remote air control module.

Figure 6:
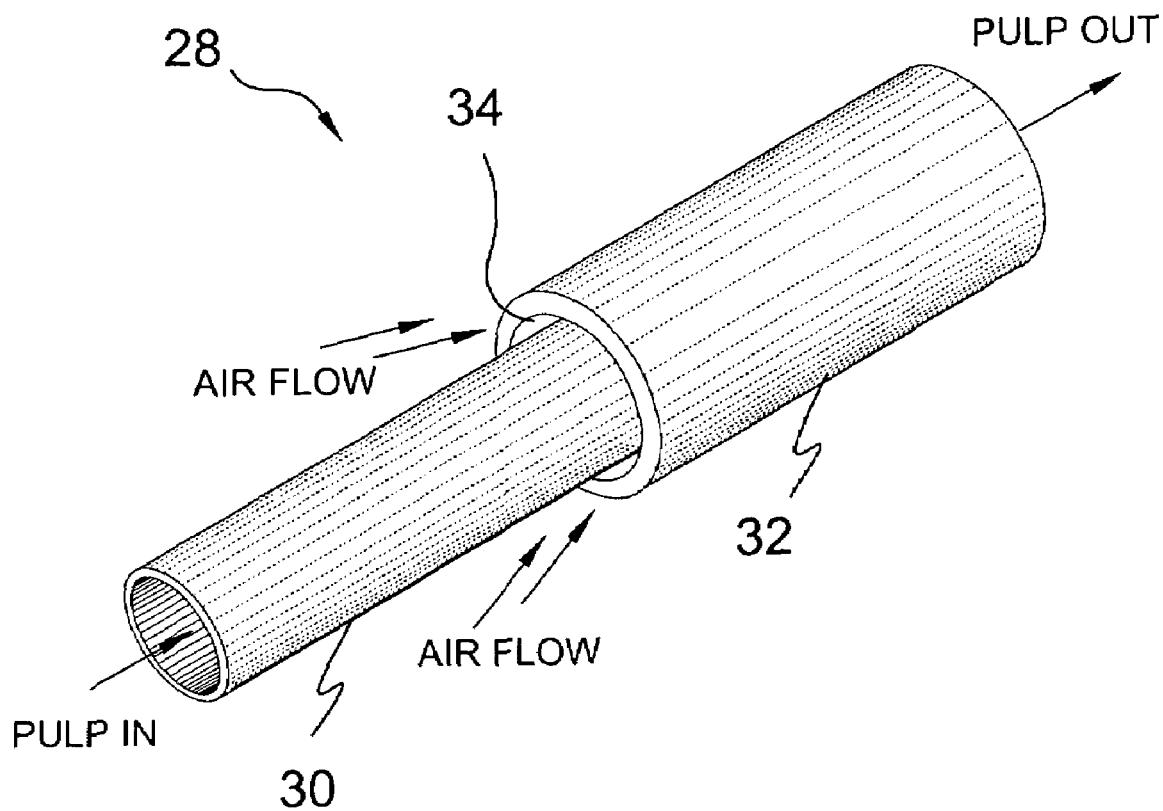
FIG. 6 is a perspective view of an injector of the present invention.

FIG. 6 is a perspective view of an injector 28 of the present invention. Shown is an injector 28 comprising an ingress nozzle 30 and a diametrically larger egress nozzle 32 arranged so that the exterior wall of the ingress nozzle 30 is spaced away from the interior wall of the egress nozzle 32 with the clearance therebetween serving as the air intake passage 34. A plurality of injectors 28 are positioned within the injector assembly supported by plates having apertures sized to receive their respective injector member. It should be noted that the number of injectors 28 within the injector assembly can vary as needed and the diameters of the ingress 30 and egress 32 nozzles is a function of the volume of air desired to be entrained within the slurry.

Figure 7:
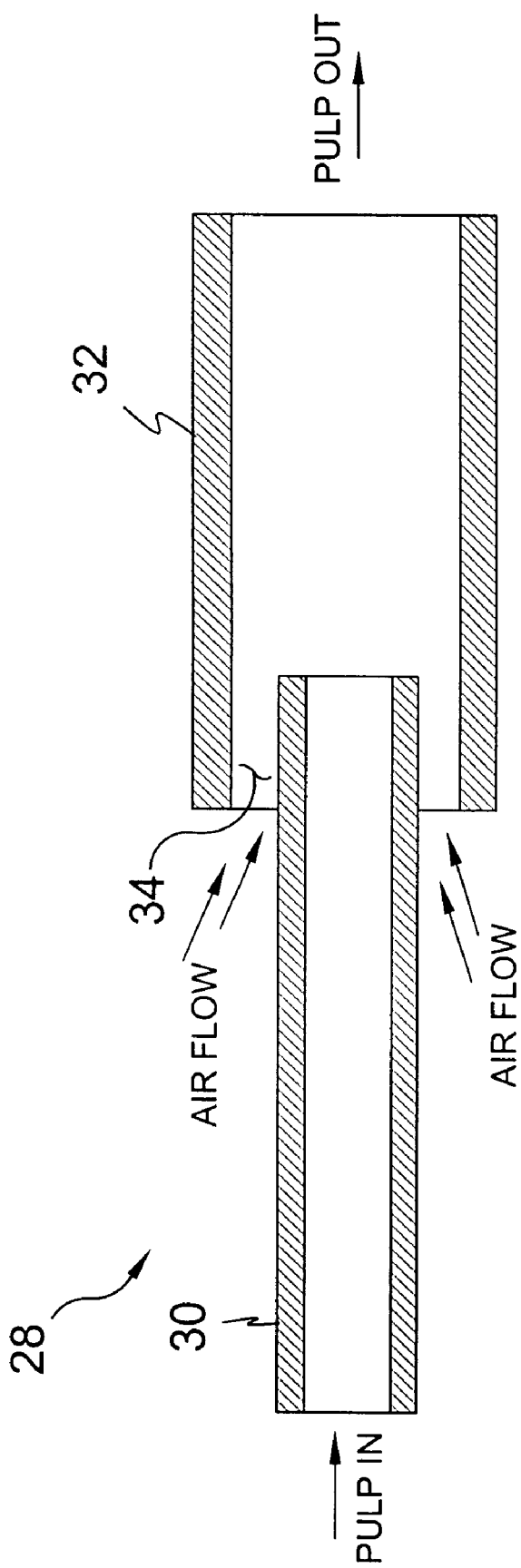
FIG. 7 is a sectional view of an injector of the present invention.

FIG. 7 is a sectional view of an injector 28 of the present invention. Shown is a sectional view of an injector 28 comprising an ingress nozzle 30 and a diametrically larger egress nozzle 32 arranged so that the exterior wall of the ingress nozzle 30 is spaced away from the interior wall of the egress nozzle 32 with the clearance therebetween serving as the air intake passage 34. A plurality of injectors 28 are positioned within the injector assembly supported by plates having apertures sized to receive their respective injector member. It should be noted that the number of injectors 28 within the injector assembly can vary as needed and the diameters of the ingress 30 and egress 32 nozzles is a function of the volume of air desired to be entrained within the slurry.

Figure 8:
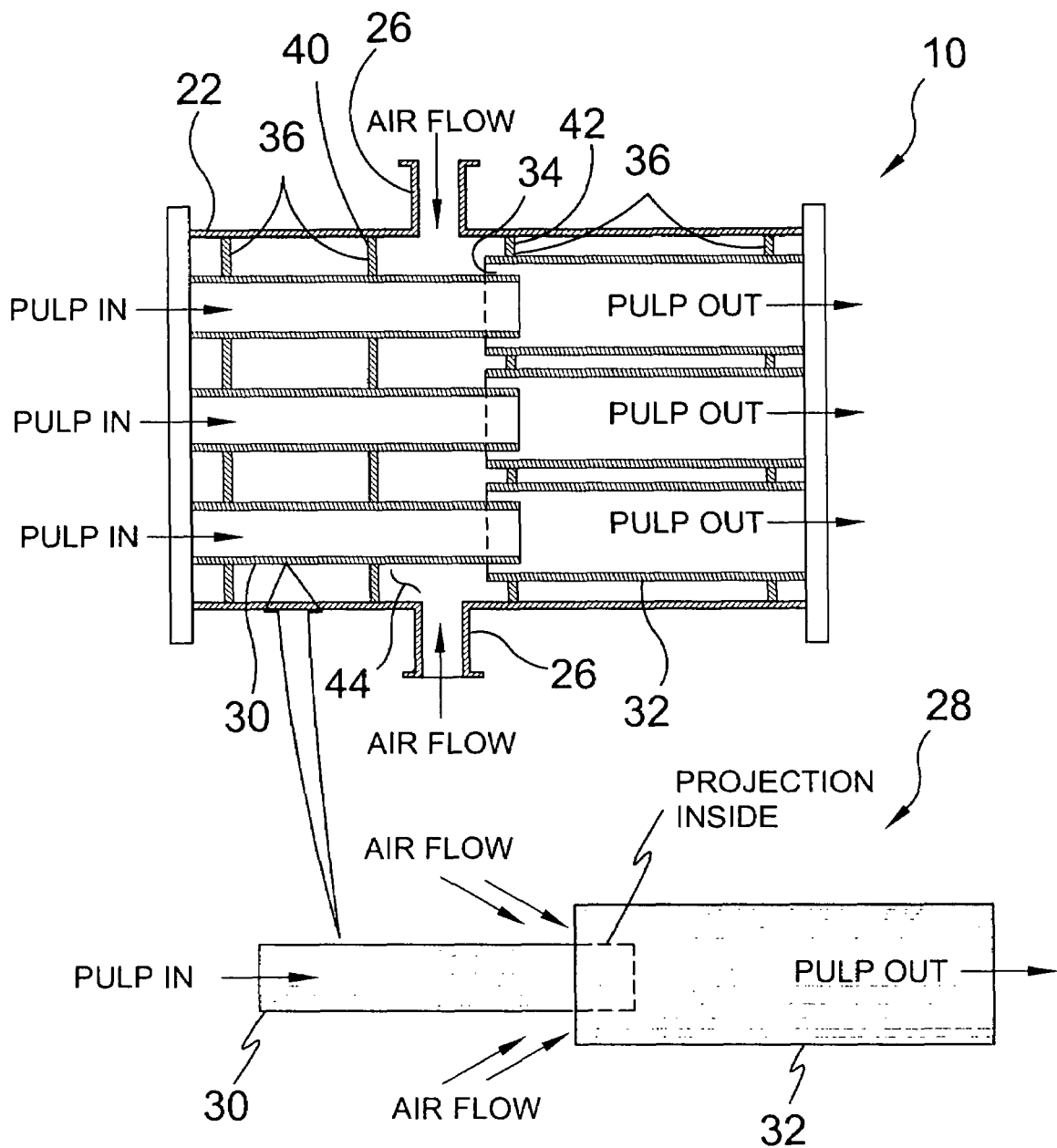
FIG. 8 is an illustrative view of the injector and injector assembly of the present invention.

FIG. 8 is an illustrative view of the injector 28 and injector assembly 10. Shown is the injector 28 positioned with the injector assembly 10 comprising a housing 22 encompassing a plurality of injector nozzles 30,32 and air intake ports 26 depending from the housing 22 for connection to an air control module. The injector assembly 10 serves to gasify a slurry by diametrically expanding the egress nozzle 32 relative to the ingress nozzle 30 so that negative pressure is created at the ingress end of the egress nozzle 32, which passively infuses the slurry with air from the air chamber 44 into air intake port 34 with air chamber 44 formed between the opposing ingress injector support plate 40 and egress support plate 42 with additional air supplied by a remote air control module. The ingress nozzle 30 is positioned a predetermined distance within the egress nozzle 32 thereby creating negative pressure that will entrain air from the air chamber 44 into the pulp slurry.

Figure 9:
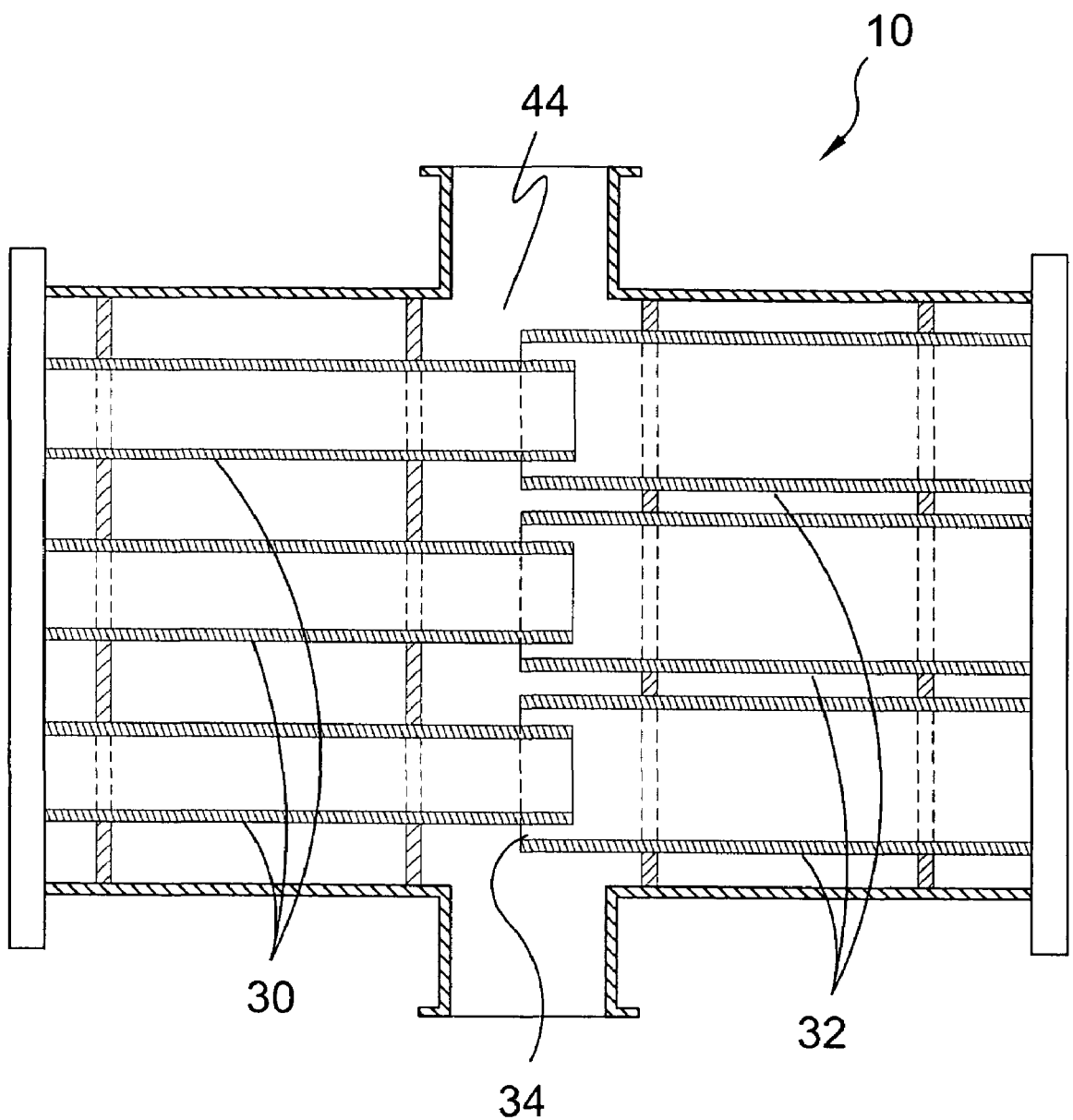
FIG. 9 is a cross sectional view of the injector assembly, taken from FIG. 2 as indicated.

FIG. 9 is a cross sectional view of the injector assembly 10, taken from FIG. 2 as indicated. The injector assembly 10 forms means for gasifying a slurry by expanding the infeed bore therein, which is connected to a source of ambient air so that when negative pressure is created air is drawn from the air chamber 44, which is in communication with an air control module, through the air intake passage 34 between the ingress nozzle 30 and the egress nozzle 32 into the slurry passing therethrough prior to injection into the cell whereupon the contaminants within the slurry combine with the air bubbles forming a foam at the surface of the cell that is passively directed into a reject nozzle leaving a decontaminated slurry accept that is channeled therefrom for further processing.

Figure 10:
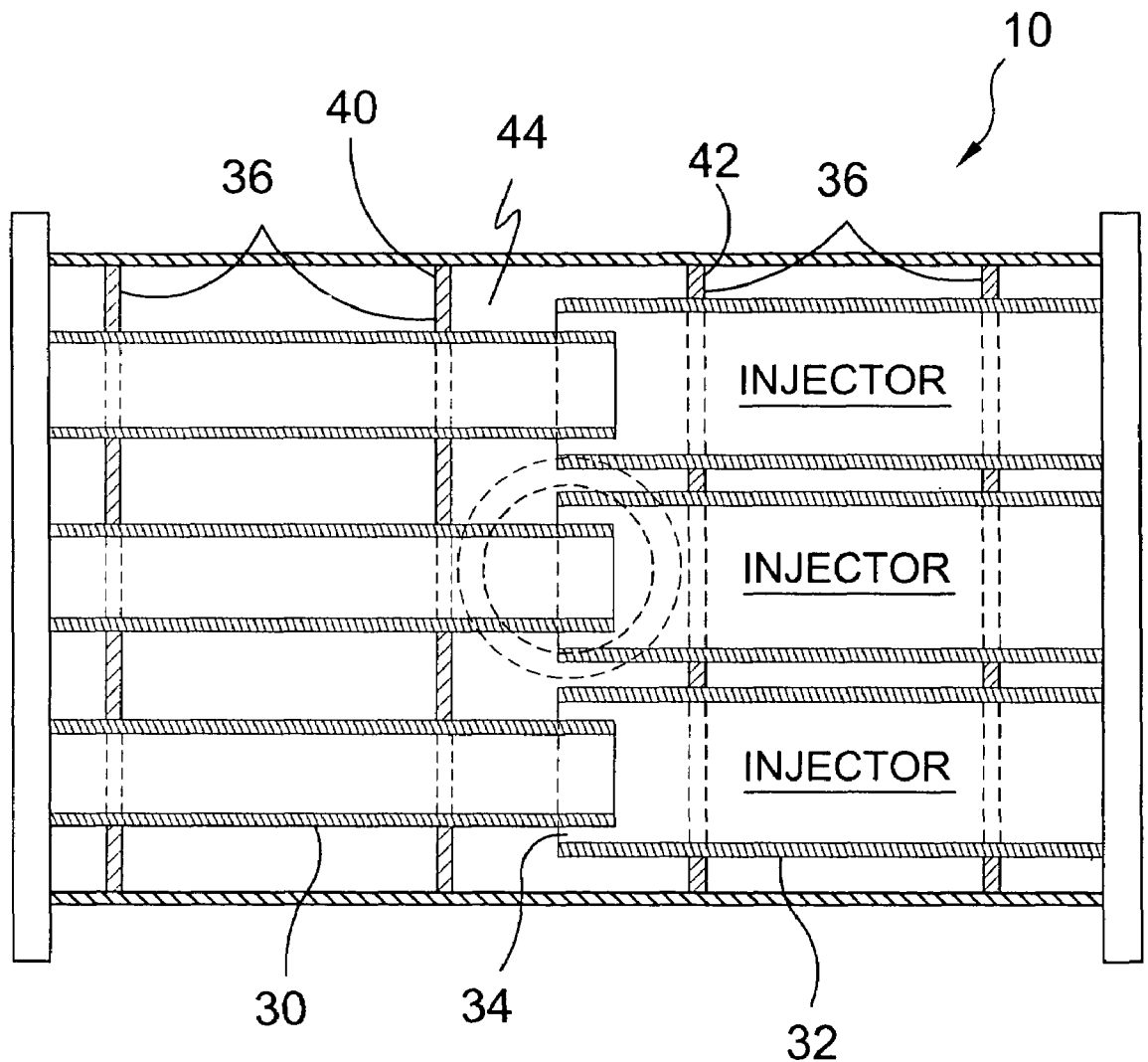
FIG. 10 is a top sectional view of the injector assembly of the present invention.

FIG. 10 is a top sectional view of the injector assembly 10 of the present invention. The injector assembly 10 forms means for gasifying a slurry by expanding the infeed bore therein, which is connected to a source of ambient air so that when negative pressure is created air is drawn from the air chamber 44, which is in communication with an air control module, through the air intake passage 34 between the ingress nozzle 30 and the egress nozzle 32 into the slurry passing therethrough prior to injection into the cell whereupon the contaminants within the slurry combine with the air bubbles forming a foam at the surface of the cell that is passively directed into a reject nozzle leaving a decontaminated slurry accept that is channeled therefrom for further processing.

Figure 11:
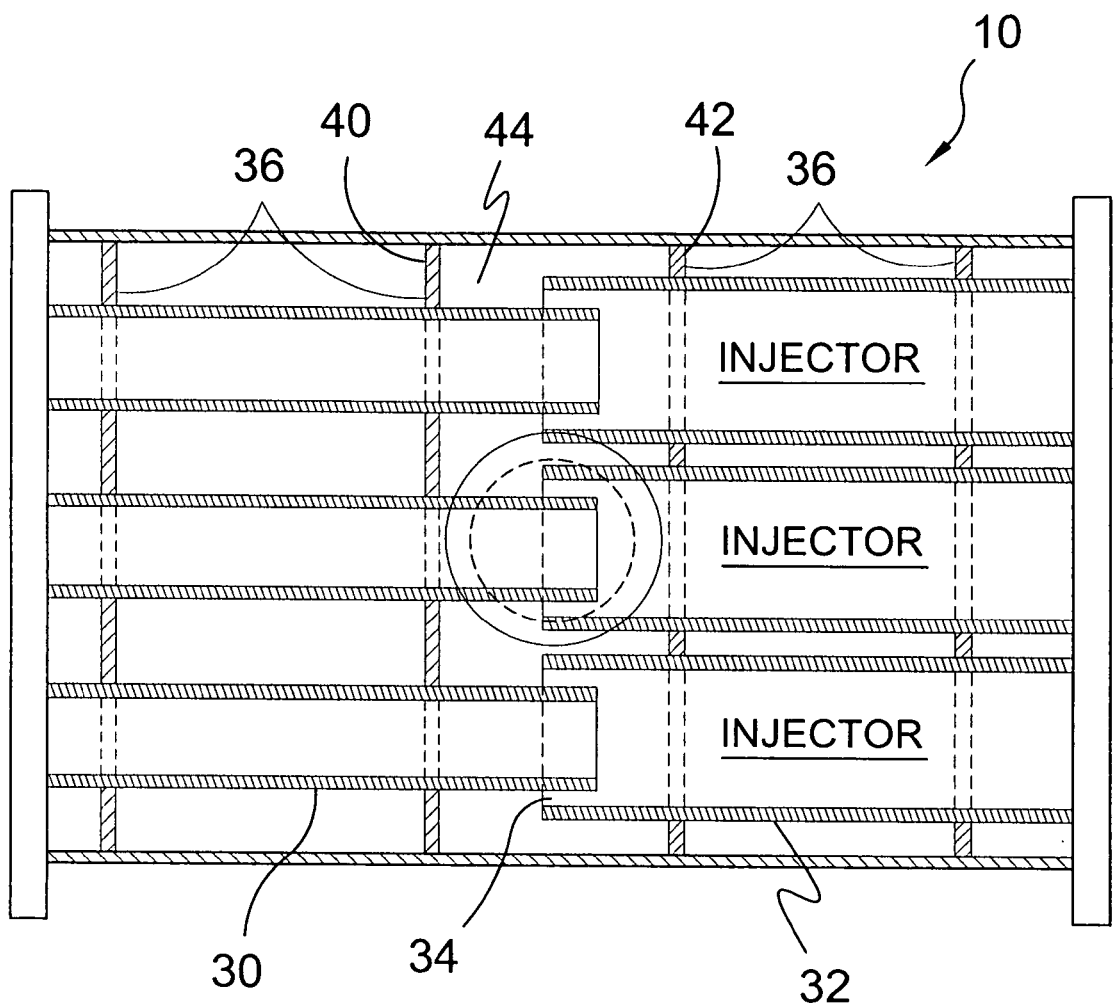
FIG. 11 is a bottom sectional view of the injector assembly of the present invention.

FIG. 11 is a bottom sectional view of the injector assembly of the present invention. The injector assembly 10 forms means for gasifying a slurry by expanding the infeed bore therein, which is connected to a source of ambient air so that when negative pressure is created air is drawn from the air chamber 44, which is in communication with an air control module, through the air intake passage 34 between the ingress nozzle 30 and the egress nozzle 32 into the slurry passing therethrough prior to injection into the cell whereupon the contaminants within the slurry combine with the air bubbles forming a foam at the surface of the cell that is passively directed into a reject nozzle leaving a decontaminated slurry accept that is channeled therefrom for further processing.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A flotation cell injector assembly for use with open or closed flotation de-inking modules for recycled paper comprising:
    a) a flotation cell for separating foam containing contaminants from a decontaminated slurry, said flotation cell having a pulp slurry feed line;
    b) a housing member connected to said slurry feed line comprising:
        i) a substantially hollow cylindrical body;
        ii) a pair of opposing flanges disposed on the ends of said body including means for installing said housing in line with said feed line; and
        iii) at an air intake port centrally disposed on said body;
    b) a plurality of injectors within said housing for injecting air into said slurry prior to entering said flotation cell, each injector comprising:
        i) a first elongate cylinder forming an ingress nozzle for receiving slurry at an entrance thereof; and
        ii) a second elongate cylinder having and interior diameter greater than the exterior diameter of said ingress nozzle forming an egress nozzle for discharging a gasified slurry into said slurry feed line connected to said flotation cell, said ingress nozzle extending into said egress nozzle whereby an air entrance into said egress nozzle is formed in an annular opening surrounding said ingress nozzle;
    c) a plurality of injector nozzle support plates disposed within said housing body for supporting said injectors wherein an adjacent pair of support plates form an air chamber surrounding the air entrances into the egress nozzles, said air chamber having an air inlet; and
    d) said flotation cell having an accept line for discharging decontaminated slurry and a reject nozzle for discharging the foam containing contaminants.

2. The flotation cell injector assembly as recited in claim 1, wherein each said injector nozzle is retained within said housing by at least two support plates wherein said apertures of the ingress support plates are substantially similar to the outer diameter of said ingress nozzles and said apertures of the egress support plates are substantially similar to the outer diameter of said egress nozzles.

3. The flotation cell injector assembly as recited in claim 2, wherein adjacent ingress and egress support plates form the air chamber surrounding said air entrances into said egress nozzles, said air chamber having an air intake port.

4. The flotation cell injector assembly as recited in claim 3, wherein an air supply line is in communication with said air intake port to provide an air source for the introduction of air into said air chamber.

5. The flotation cell injector assembly as recited in claim 4, wherein said air line is in communication with an air control module thereby enabling the user to vary the slurry mixture by infusing air therefrom.

* * * * *